United States Patent [19]

Cornell

[11] 4,295,974
[45] Oct. 20, 1981

[54] BLOOD SAMPLE COLLECTION AND PHASE SEPARATION DEVICE

[75] Inventor: William D. Cornell, Ballwin, Mo.

[73] Assignee: Sherwood Medical Industries Inc., St. Louis, Mo.

[21] Appl. No.: 146,845

[22] Filed: May 5, 1980

[51] Int. Cl.³ ............................................. B01D 21/26
[52] U.S. Cl. ...................................... 210/789; 53/474; 210/516; 210/927; 422/101; 422/102
[58] Field of Search ............... 210/782, 789, 927, 516; 53/474; 128/764, 766; 422/101, 102

[56] References Cited

U.S. PATENT DOCUMENTS

| | | | |
|---|---|---|---|
| 3,852,194 | 12/1974 | Zine | 210/789 |
| 3,963,119 | 6/1976 | Lukacs et al. | 210/789 |
| 3,970,565 | 7/1976 | Ahlstrand et al. | 210/789 |
| 3,976,579 | 8/1976 | Bennett | 210/789 |
| 3,986,962 | 10/1976 | Kessler | 210/789 |
| 4,049,692 | 9/1977 | Zine | 210/789 |
| 4,152,269 | 5/1979 | Babson | 210/927 |
| 4,202,769 | 5/1980 | Greenspan | 210/789 |

Primary Examiner—Ivars C. Cintins
Attorney, Agent, or Firm—Stanley N. Garber; William R. O'Meara

[57] ABSTRACT

A blood collection tube is provided with a blood phase partitioning device disposed in the upper portion or adjacent the low density blood phase end of the tube. The device carries blood phase barrier gel-like material which flows through a restricted orifice in the device to meter or reduce the flow rate of the material into the blood during centrifugation to suitably delay the formation of the complete phase barrier until complete blood phase separation has taken place.

19 Claims, 5 Drawing Figures

U.S. Patent     Oct. 20, 1981     4,295,974
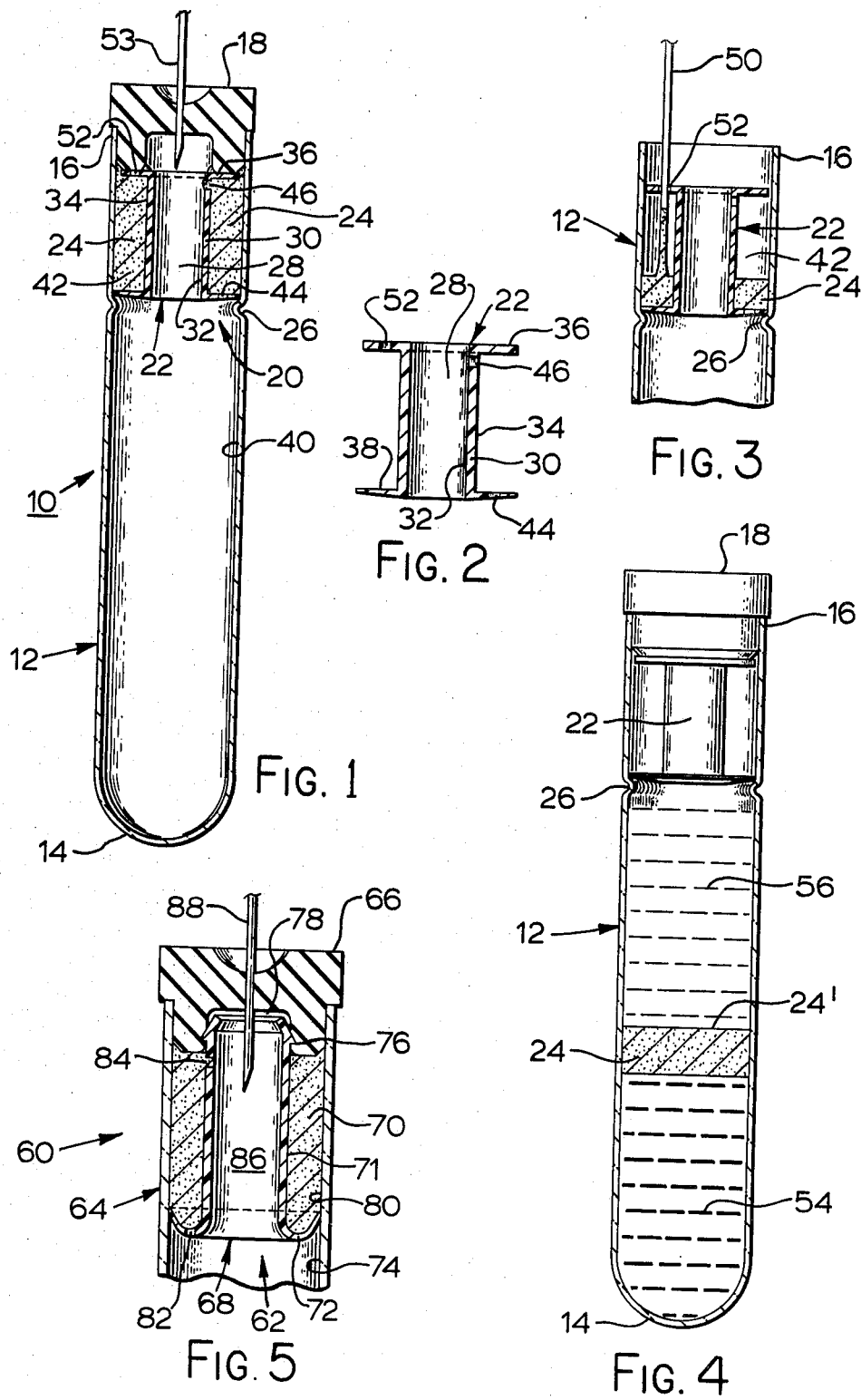

BLOOD SAMPLE COLLECTION AND PHASE SEPARATION DEVICE

DESCRIPTION

Technical Field

This invention relates to blood sample collection devices and more particularly to blood sample collection devices having blood phase partitioning material for producing a partition barrier between the separated phases during centrifugation of the device.

BACKGROUND ART

The use of blood phase partitioning, thixotropic, gel-like materials in blood collection devices to automatically provide a partition barrier between the centrifugally separated blood phases is well known. For example, mixtures of silicone and silica powders are disclosed in U.S. Pat. Nos. 3,852,194 and 4,049,692, the disclosures of which are incorporated herein by reference. Other mixtures such as a mixture including liquid polybutene, polybutadiene or polymer, and one or more silica powders are also now well known blood phase partitioning materials. These gel-like mixtures are formed so that they have a specific gravity between those of the separated low and high density phases so that the material forms a barrier between the separated phases.

Such gel-like materials or sealants have been placed in the bottom of the collection container or tube, as in the above-mentioned U.S. Pat. No. 3,852,194. Some of the problems resulting from such an arrangement have been that the descending high density cellular phase and the ascending gel-like material collide under centrifugal forces which can cause red cell hemolysis and the gel-like material to carry red cells to the blood phase interface zone in the tube. In either case, there may be contamination of the low density phase, serum or plasma, which may result in inaccurate test results. Also, such collision between the gel-like material and the cellular phase components tends to delay the complete formation of the phase partitioning barrier thus requiring longer centrifugation at greater cost. On the other hand, in some cases, the barrier may be formed too soon, causing cells to be trapped in the light phase and contamination.

In U.S. Pat. No. 3,963,119, a silicone-silica material in a dispenser is placed in the open end of a container tube of blood and the device is centrifuged to separate the blood phases and form a phase partitioning barrier. In that construction, the gel-like material flows downwardly toward the interface zone instead of up through the cellular phase. However, such a system requires that the blood filled tube be opened to insert the gel-like material. This presents the danger that blood components of the sample will contact the person handling the container and subject that person to possible disease. Also, airborne matter can enter the sample and affect test results.

In U.S. Pat. No. 3,986,962, a sealant dispenser is inserted into a socket of a stopper such that during centrifugation, the sealant will flow downwardly out of the dispenser to the phase interface to form a barrier. The dispenser has a tubular body with a relatively narrow central conduit which receives the needle during the blood filling of the tube. The gel-like material or sealant is disposed between the outside surface of the conduit and the inner sidewalls of the tubular body. With such a construction there is considerable chance that the blood filling needle will enter the sealant instead of the conduit. If the conduit is made larger, the space for the sealant would be decreased. Also, the dispenser allows substantially unrestricted sealant flow which, in some cases, may produce a barrier across the tube before all the cells have been centrifuged to the bottom portion of the tube.

SUMMARY OF THE INVENTION

The above-mentioned problems are substantially overcome in accordance with one aspect of the present invention by providing a phase partitioning device having phase partitioning sealant, the device being disposed in a blood collection container adjacent one end thereof that receives a stopper. The device has a restricted passage for the flow of sealant to the interior of the container during centrifugation so that a barrier is formed between the separated blood phases.

BRIEF DESCRIPTION OF THE DRAWING

FIG. 1 is an elevational cross-sectional view of a blood collection device in accordance with a preferred embodiment of the present invention;

FIG. 2 is an enlarged, elevational cross-sectional view of a spool member of the phase partitioning device of FIG. 1;

FIG. 3 is a fragmentary cross-sectional elevational view illustrating one method of filling the spool member of FIG. 1 with gel-like phase partitioning material;

FIG. 4 is a cross-sectional elevational view, with some parts in full, showing the blood collection device of FIG. 1 after receiving a whole blood sample and complete phase separation and partitioning of the blood sample; and FIG. 5 is a fragmentary cross-sectional elevational view showing a blood collection device in accordance with a modified embodiment of the present invention.

DETAILED DESCRIPTION OF THE INVENTION

Referring now to the drawing and particularly to FIG. 1, a blood collection device 10 is shown including a container 12, such as a glass blood collection tube, closed at its lower end by an integral end portion 14 of the tube, and having an open upper end 16. The upper end 16 of the tube is closed by a stopper 18 inserted into the upper end. Stopper 18 is preferably made of a suitable or conventional elastomeric material which is pierceable by a needle cannula for the purpose of introducing blood into the tube through the stopper, and which is self-sealing at the penetration site.

Disposed within the tube 12 adjacent the upper end 16 and stopper 18, is a blood phase partitioning device 20 which includes a sealant retainer 22, and a quantity of blood phase partitioning material 24 in the retainer. The retainer 22 is shown for illustration as being secured in its position between the stopper 18 and an annular, radially inwardly extending tube constriction 26 formed in the sidewall of tube 12 at a location adjacent the bottom end of retainer 22.

As seen also in FIG. 2, the retainer 22 of the phase partitioning device 20 is shown in the form of a spool member having a through-bore or passage 28. The spool-shaped member 22 has a main, longitudinally extending body portion 30 which is shown cylindrical and with inner and outer cylindrical walls 32 and 34.

The spool member 22 has integral upper and lower radial flanges 36 and 38 at its opposite ends.

As seen in FIG. 1, the phase partitioning material or sealant 24 is disposed between the outer wall 34 and the inner sidewall 40 of the tube 12. The sealant 24 fills the annular space or reservoir chamber 42 defined by the facing surfaces of the flanges 36 and 38, the outer surface 34 of spool member 22, and a portion of the inner surface of the sidewall 40 of tube 12, which sidewall portion is radially outwardly of and facing the spool member wall 34. The spool member 22 has a restricted orifice or restricted flow passage 44 communicating between the sealant reservoir chamber 42 and the interior portion of the tube 12 that is below the stopper 18 and partitioning device 20 and which receives the blood sample. The restricted flow passage 44 is adjacent the lower end of chamber 42 and is shown extending through the flange 38. A vent passage 46 is disposed near the upper end of the spool member 22 which communicates with the sealant reservoir chamber 42. The vent passage is shown extending through the main body portion 30 near the upper flange 36. The vent passage 46 permits air or gas in the upper portion of the tube during centrifugation to flow into the reservoir chamber 42 allowing sealant material to flow through the restricted passage 44 to the interior of the tube containing the blood sample.

The sealant material 24 may be any of the previously mentioned materials or others. For example, it may be a mixture of silicone liquid and silica powder. These gel-like thixotropic materials are inert with respect to the blood. Such materials are semi-solid at rest but, under centrifugal forces, are flowable. The sealant 24 is formed so that it has a specific gravity intermediate those of the light phase (about 1.03), serum or plasma, and the heavier cellular phase (about 1.09). For example, the sealant 24 may be made to have a specific gravity of about 1.045.

While various methods of filling the retainer or spool member 22 are possible, a preferred method is illustrated in FIG. 3 which includes inserting the spool member 22 into the open end 16 of the tube 12 until it engages the tube constriction 26. Then a nozzle 50 connected to a pressurized sealant material source (not shown) is inserted through a sealant fill hole 52 provided, for example, in the upper flange 36. Pressurized sealant material is then forced into chamber 42 until it is filled. The nozzle 50 is removed and the stopper 18, while in a suitable evacuation chamber, is inserted into the upper end 16 of the tube to sealingly close and thereafter maintain the negative pressure within the tube. Preferably, the gel-like sealant is introduced into the tube until it fills the reservoir 42 and then slightly overflows or flows over the upper flange 36. In this way, when the stopper is inserted into the upper end 16 of the tube, the bottom of the stopper will engage the sealant and the sealant will fill all spaces, as shown in FIG. 1, between the stopper and retainer member 30. The stopper 18 is shown engaging flange 36. Also, in the illustrated embodiment all spaces between the inner sidewall of the tube 12 and the retainer member 22 are filled with sealant. In this way, when blood is introduced into tube 12, it will not flow into any interstices between internal parts since such interstices are filled with sealant. This avoids the trapping of blood cells in the upper portion of the tube that could otherwise subsequently contaminate the low density phase or serum after phase separation.

In use, a conventional needle and tube holder having a double-ended needle cannula 53 may be used for introducing a sample of whole blood from a blood vessel, such as a vein of a patient, into the blood collection device 10. In such case, the distal end (not shown) of the needle is inserted into the vein of a patient and the collection device 10 is inserted into the holder until the proximal end of the needle pierces stopper 18 and enters the interior of the tube 12 as shown. Because of the pressure differential between the pressure of the blood in the vein and the negative pressure in the tube, blood readily flows from the vein filling the tube to a predetermined level. Blood can flow from the needle through the main passage 28 in the blood phase partitioning device 20 and into the interior of the tube.

Where it is desired to separate serum from the whole blood, a blood clot is first formed within the tube and then the tube is placed in a centrifuge to separate the serum phase from the heavy cellular phase. Since there is no sealant material in the lower portion of the tube, the cellular phase or blood clot has an unimpeded flow path to the bottom end 14 of the tube during centrifugation.

During centrifugation, the sealant 24 flows through restricted orifice from the reservoir chamber 38 to the interior of the tube below the partitioning device 20. Sealant 24 migrates downwardly toward the interface of the two phases during centrifugation. Eventually the blood phases separate with the heavy or high density cellular phase at the bottom of the tube 12, such as indicated at 54, in FIG. 4, the light or low density phase or serum indicated at 56, at the tope of the tube, and with the sealant 24 forming a barrier 24 which extends transversely across the tube between the two separated phases 54 and 56. The barrier 24 forms a liquid impervious barrier or seal partitioning the phases from each other and maintaining the light phase free of contact with the cellular phase, the barrier 24 forming a semi-solid seal.

With this construction, the sealant 24 can be made to discharge relatively slowly through the orifice 44 to ensure that complete phase separation has occured before the upper layer of the sealant forms across the barrier 24. For sealant material of given viscosity the flow rate of the sealant can be made to vary by varying the size of the orifice 44 or the number of orifices. With typical speeds of centrifugation, the discharge flow rate may be made such that a complete barrier is formed in about 3 to 6 minutes. The flow rate, of course, is determined primarily by viscosity, size of discharge orifice(s), and centrifuge speed.

Since the sealant flows from the upper portion of the tube, the blood clot and sealant do not interfere with each other in their movement within the tube, so that the cellular phase separates relatively rapidly. Also, any slow-to-settle cells are covered by the last portion of the sealant 24 since it comes from above the interface zone. Thus, the sealant, instead of carrying cells to the interface, covers the upper portion of the barrier as it is forming.

In FIG. 5 there is shown a modified blood collection device 60 including a blood phase partitioning device 62, blood collection container or tube 64, and a stopper 66. Device 62 includes a sealant retainer 68 and a gel-like sealant 70. Retainer 68 includes a cylindrical main portion 71 and an internal lower flange 72 that resiliently and sealingly engages the inner sidewall 74 of the tube 64 in which device 62 is disposed. The main portion 71 has an annular friction rib 76 at the upper end which is forced into the sidewalls of a recess 78 in the stopper 66 to fix the partitioning device 62 in place near the upper end of tube 64. The outer diameter of main portion 71 is substantially less than the inner diameter of tube 64 so that a sealant reservoir chamber, indicated at 80, is defined by portions of the bottom of the stopper 66, the flange 72, the outer surface of main portion 71, and a portion of the inner surface 74 of tube 64. A discharge restricted passage 82 is located in flange 72. A vent passage 84 is provided in the upper end of the main portion 71 to provide air or gas flow into the top of sealant reservoir 80 as the sealant 70 flows through the discharge orifice 82 into the tube below device 62 during centrifugation. The retainer 68 has a central or axial passage 86 extending through it.

A needle 88 is shown piercing the stopper 66 and entering passage 86 to deliver whole blood into the tube 64 from a blood vessel. The use and the function of the device 60 is similar to that already described in association with device 10 of FIG. 1. For example, during centrifugation gel will flow through the discharged orifice 82 at a predetermined metered rate so that a barrier will be formed between the separated phases, for example, after 3 minutes of centrifugation. Since the gel comes from above, it will cover any last-to-settle red cells to provide a highly desirable partition barrier between the separated phases. As with the device 10 of FIG. 1, the sealant and cellular phase in device 60 do not interfere with each other during movement to their final locations in the tube. Also, since the sealant 70 is in the upper portion of the tube and in air relatively high pressurization of the sealant for good control is also obtained.

The sealant retainer 22 (FIG. 1) and retainer 62 (FIG. 5) may be formed of any suitable material, for example, they may be of a suitable rubber or synthetic plastic, such as an elastomer.

The retainer members 22 (FIG. 1) and 68 (FIG. 5) may be filled with the sealant materials (24, 70) before the members are inserted into their tubes, if desired. The sealant is shown engaging the inner sidewall of the tube and the outer surface of the retainer in each of the embodiments illustrated. As previously mentioned, this tends to prevent blood flow between these surfaces and the trapping of blood cells. The sealant in each embodiment is also in contact with the bottom surface of the stopper including the space between the stopper bevel and tube which prevents cells from remaining on portions of the stopper adjacent the tube wall.

The gel-like material should have a flow rate through the restricted orifice or orifices for centrifugal speeds typically employed, such that all of it that flows out of the partitioning device should do so in not less than about a minute.

While a restriction on the sidewall of the collection tube 12 is used to hold the partitioning device 20 in fixed position, and the partitioning device 62 is fixed to the stopper, other holding means, such as a rod or the like, extending between the bottom of a partitioning device and the bottom inside wall of the tube could be used to hold the device in place.

As various changes can be made in the above construction and method without departing from the scope of the invention, it is intended that all matter contained in the above description and shown in the accompanying drawing shall be interpreted as illustrative and not in a limiting sense.

I claim:

1. A blood collection device for receiving a blood sample, centrifugally separating the blood sample into its relatively light and heavy blood phases, and forming a partition barrier between the separated phases during centrifugation of the device comprising a container having a closed bottom end and an open upper end, an end closure closing said upper end, and phase partitioning means retained in said container near said upper end, said partitioning means including a member having an outer wall spaced radially from the inner sidewall of said container, phase partitioning, gel-like material disposed between and in contact with said outer wall and said inner sidewall, and means defining a restricted flow passage in said member communicating with said partitioning material and the interior of said container below said phase partitioning means, said gel-like material having a specific gravity between that of the separated light and heavy phases and flowable through said restricted flow passage to a location between the separated phases during centrifugation of the device to form a barrier partitioning the separated blood phase.

2. The device of claim 1 wherein said member has a flange at the bottom thereof.

3. The device of claim 2 wherein said restricted flow passage extends through said flange.

4. The device of claim 3 wherein said flange sealingly engages said inner sidewall.

5. The device of claim 1 wherein said member has a vent opening adjacent the upper end thereof for the flow of gas into the space occupied by said gel-like material as it flows through said restricted flow passage during centrifugation.

6. The device of claim 1 wherein said gel-like material is in contact with a lower surface of said closure adjacent said inner sidewall.

7. The device of claim 1 wherein said member is secured to said end closure.

8. The device of claim 1 including securing means in said container engageable with said member to prevent movement thereof into said bottom end of said container during centrifugation of the device.

9. The device of claim 8 wherein said securing means is an integral constriction formed in said container engageable with a bottom portion of said member.

10. The device of claim 1 wherein said member is a hollow member allowing blood flow therethrough when a blood sample is introduced into said container.

11. The device of claim 1 wherein said end closure is a needle-pierceable stopper, and said member is a hollow member through which blood can flow when introduced by means of a needle piercing stopper.

12. The device of claim 1 or 11 wherein said container is air evacuated.

13. The device of claim 1 wherein said member is a spool having a central flow passage therethrough, and upper and lower flanges.

14. The device of claim 1 wherein said container is a tube, said end closure is a needle-pierceable stopper in said open end of said tube, said stopper having a recess on the inner side thereof, said member having an upper annular portion extending into said recess and frictionally engaging the inner sidewall of said recess to fix said partitioning means in place in said tube.

15. The device of claim 1 wherein said restricted flow passage is sized to restrict the flow of said gel-like material such that said barrier is fully formed no sooner than about 1 minute after the start of centrifugation of the device.

16. The method of making a blood collection device adapted to receive a blood sample and be centrifuged to separate and partition the sample into its relatively light and heavy phases comprising the steps of providing a blood collection container having a closed bottom end and an open upper end, inserting a member into the open end of the container to a position adjacent the open end, the member having an outer surface spaced from the inner sidewall of the container to provide a space therebetween, inserting a nozzle into said space and forcing blood phase partitioning, a gel-like material through said nozzle to fill said space and contact the container, said member having a restricted orifice through which the gel-like material can flow into the container below the member under centrifugal force, removing the nozzle, and inserting an end closure into the upper open end of the container to close the same.

17. The method of claim 16 wherein the tube has a reduced inner diameter portion engageable with said member to prevent movement thereof toward the bottom end of the container.

18. The method of claim 16 wherein said member is a spool-like member having upper and lower annular flanges with a nozzle entrance opening extending through the upper flange, and wherein said step of injecting said nozzle includes inserting said nozzle in said entrance opening.

19. The method of collecting a sample of whole blood, and separating and partitioning it into its relatively high and low density phases comprising the steps of providing an evacuated container having a closed bottom end and an open upper end, a phase partitioning device in the container near the upper end of the container which has a main portion spaced from the inner sidewall of the container, a quantity of thixotropic gel-like blood phase partitioning material in an initial location between and in contact with said main portion and inner sidewall of the container, restricted orifice means communicating between the gel-like material and the interior of the container below the partitioning device, and a stopper in the open end of the container, introducing a sample of whole blood into the interior of the container by piercing the stopper with a needle cannula connected to a source of whole blood, centrifuging the container to centrifugally separate the whole blood sample into its low and high density phases, and moving the gel-like material from its initial location through said restricted orifice means and into the interior of the container below the partitioning device under the influence of centrifugal forces during centrifugation at a flow rate requiring that the barrier formed by the gel-like material takes at least 1 minute to become completely formed.

* * * * *